United States Patent Office 2,762,725
Patented Sept. 11, 1956

2,762,725

METHOD OF PRODUCING A METAL FILM ON A REFRACTORY BASE HAVING A METAL OXIDE FILM THEREON

Arnold E. Saunders, Sarver, Pa., assignor to Pittsburgh Plate Glass Company, Allegheny County, Pa., a corporation No Drawing. Application March 14, 1952,
Serial No. 276,679

11 Claims. (Cl. 117—227)

This invention relates to a method of reducing tin oxide to tin and it has particular relation to a method of reducing a transparent electroconductive tin oxide film on a refractory base to a tin film on a refractory base.

It is known that transparent electroconductive films may be deposited upon glass by applying stannic chloride to the surface of glass heated above 500° F., preferably 850 to 1350° F. Films of superior conductivity may be produced according to methods described in a copending application for U. S. Letters Patent Serial No. 762,658 filed July 22, 1947, now Patent Number 2,614,944, by William O. Lytle, by spraying plate, window or other glass while it is heated to a temperature of above 500° F., but below the temperature at which the glass becomes molten, with tin tetrachloride or other tin salts in aqueous solution or in vapor state in the presence of a reducing agent, such as methanol, phenyl hydrazine hydrochloride or other agents. The films thus obtained are of unknown composition but appear to contain a preponderant amount, of the order of 97 to 99 per cent, of a tin oxide, and certain impurities which may include metallic tin, carbon, silicon, sodium and chlorine and other impurities, depending upon the composition of the applied tin-containing solution.

These films have a thickness of about 50 to 800 millimicrons, are transparent, and have the unusual characteristic of being electroconductive, the particular degree of electroconductivity being dependent to a large degree upon the nature of the process of depositing the films. Tin oxide films which are deposited in accordance with the process described above have a resistance below about 500 ohms per unit square, and a specific resistance below about 0.002 ohm centimeters. Further details respecting the production of these films will be supplied hereinafter.

Although articles having such films are useful in many fields, they have been found to be especially useful as windshields or viewing closures in automobiles, aircraft, trains, and similar automotive vehicles. In such use the coating is placed in series with a source of electric potential, and is used as a heating element in order to heat the closure and prevent deposition of ice, fog, etc., thereupon. Usually, they are laminated with a suitable plastic, such as polyvinyl butyral, to reinforce the glass and provide a so-called "safety glass" construction.

It is also known that transparent electroconductive metal oxide films may be produced wherein the film is composed of other metal oxides in combination with tin oxide or of other metal oxides alone such as cadmium oxide, indium oxide and zinc oxide or combinations thereof.

One of the problems in producing transparent electroconductive panels is the provision of satisfactory inexpensive metal strips which serve as bus bars. These metal strips should adhere firmly to the glass sheet, should be in good electrical contact with the transparent electroconductive films, and should have conductivity at least 10 to 20 times that of the transparent electroconductive film.

It is also desired in the manufacture of certain electroconductive panels to provide certain areas of the base with a film of higher conductivity than the transparent electroconductive film in order to eliminate excessive overheating in these areas. Such excessive heating frequently results in fracture of the refractory base. Such fractures and failures have been discovered to be particularly apt to occur in certain panels having a contour such that the bus bar must be disposed in a nonparallel relationship for maximum vision or when one bus bar of a pair of bus bars (whether parallel or not) is longer than the other.

In accordance with this invention it has been found that these transparent electroconductive metal oxide films, such as tin oxide film, may be treated to reduce the tin oxide and to produce an adherent coating of tin metal on the glass or refractory base upon which the tin oxide film may have been deposited. This may be accomplished by subjecting the film or a portion thereof with a metal more electro-positive than the metal of the metal oxide film, a non-oxidizing acid and a salt of a non-oxidizing acid and iron, cobalt or nickel. In order to clearly define terms, an oxidizing acid as described herein refers to an acid that does not release hydrogen upon reaction with a metal of the class utilized herein to reduce a metallic oxide coating to a metallic coating, whereas a non-oxidizing acid reacts with a metal of the same class to form hydrogen and the metal salt containing the acid radical. For purposes of determining which metals are more electro-positive than the metal of the metal oxide film such as tin, the alkali metals are regarded as being the most electro-positive and gold and platinum are regarded as being most electro-negative metals in the chemical activity series. For example, zinc, cadmium, iron and aluminum are metals which are more electro-positive than tin and which may be employed to reduce tin oxide films.

The invention may be practiced by simultaneously contacting the tin oxide film or portion thereof with a metal more electro-positive than tin, such as zinc, a non-oxidizing acid such as HCl, and a salt of a non-oxidizing acid and iron, cobalt or nickel.

A further embodiment of the invention comprises depositing a pulverulent metal which is more electro-positive than tin such as zinc together with a dispersing agent and a water dispersible binder which serves as a binding medium to hold the zinc on the base, upon the tin oxide film or portion thereof to be reduced. Thereafter, the zinc or other metal coating may be sprayed or otherwise coated with an aqueous solution of a non-oxidizing acid and a salt of a non-oxidizing acid and iron, cobalt or nickel.

Furthermore, the metal oxide film may be coated with a solution of the non-oxidizing acid and salt of a non-oxidizing acid and iron, cobalt or nicket and thereafter contacted with a block or pencil of zinc or equivalent metal. Such method is especially applicable when only specified areas of the tin oxide film are desired to be reduced to tin. Other methods whereby the tin oxide film is contacted simultaneously with the electro-positive metal, a non-oxidizing acid and the salt of a non-oxidizing acid and iron, cobalt or nickel may be used according to this invention.

A shiny tin film is produced in the areas of the transparent electroconductive tin oxide film thus treated. The transparent electroconductive tin oxide film may be thus treated along opposing edges of the refractory base to form thin tin strips along such edges which may be reinforced by suitable metal, such as copper, to form satisfactory bus bars. The tin film thus formed has a thickness of about 50 to 800 millimicrons, and a resistivity of from less than 1 ohm to 50 to 100 ohms per square. The tin film thus produced may be thickened by electrodeposition, dipping, cathode sputtering or other device.

The shiny tin film produced on a refractory base in accordance with this invention is capable of many uses. It may be used as a front surface mirror. In addition it may be used as a base to which other metals may be soldered or otherwise connected to form an adherent glass to metal seal which is desirable in the manufacture of many commercial products such as television tubes and double glazed windows.

The following example illustrates the manner in which a transparent electroconductive tin oxide film may be reduced to a tin film in accordance with the invention.

*Example I*

A piece of lime-soda plate glass 6 inches by 6 inches by 3/16 inch was placed in a furnace and heated at a furnace temperature of 1050° F. for about 3 minutes. Immediately after this, the heated base was removed from the furnace and sprayed with 10 cubic centimeters of a solution composed of the following ingredients:

| | |
|---|---|
| Stannic chloride_____grams__ | 20,430 |
| Phenylhydrazene hydrochloride_____do____ | 639 |
| An aqueous solution of hydrofluoric acid_do____ | 134 |
| Distilled water_____milliliters__ | 7,056 |
| Dioctyl sodium sulfosuccinate solution__do____ | 918 |
| Methanol _____do____ | 2,250 |

A clear transparent electroconductive tin oxide film having a resistance of about 50 to 125 ohms per unit square was obtained.

A slurry of pulverulent powdered zinc was applied to the base. The slurry was prepared in the following manner:

A solution of the following composition was prepared:

| | |
|---|---|
| Water_____cubic centimeters__ | 3,500 |
| Glycerol _____do____ | 50 |
| Sodium nitrate_____grams__ | 10 |
| Sodium pyrophosphate_____do____ | 5 |
| Bentonite _____do____ | 25 |

This solution was mixed in equal parts by volume with methanol, and one pound of powdered zinc was then added per quart of the resulting methanol solution. About 5 cubic centimeters of the solution thus obtained was then applied to the coated base to deposit a thin zinc-containing film upon the surface thereof and allowed to dry.

About 25 milliliters of a solution made up of ferric chloride and 1.5 normal hydrochloric acid was then applied to the zinc coating. The concentration of the ferric chloride was about 2 per cent by weight of the hydrochloric acid. This solution contains ferric chloride and hydrochloric acid in the proportions of about 12 mols equivalents of hydrochloric acid to each mol of ferric chloride. An adhering layer of bright tin metal was formed in the areas coated with the zinc and acid-salt solution. The tin film had a resistivity of 14 ohms per unit square.

The amount of zinc or other electropositive metal which should be employed per square centimeter of metal oxide film depends upon the thickness of film to be reduced. For example, the amount of zinc which should be employed to reduce a layer of tin oxide film of about 100 millimicrons thickness is about 0.001 gram per square centimeter or more depending upon any tendency of the zinc to float or otherwise move off the film before acting upon the film.

Thus it can be seen for example that when a tin oxide film of 400 millimicrons thickness is treated with only sufficient zinc, non oxidizing acid and iron, cobalt or nickel, salt to reduce a layer 200 millimicrons in thickness that there still remains intermediate the tin film and the refractory base, a layer of tin oxide film which is tightly adherent to the refractory base.

It appears that the metal film is slightly more adherent when a thin layer of the metal oxide film is allowed to remain on the base. The terminology in the claims relating to a tin or metal film on a refractory base are intended to include those tin or metal films that are produced by reducing all or only a portion of the thickness of the metal oxide film.

The following example illustrates a method whereby only a certain thickness of a tin oxide film on a refractory base is reduced to an adherent tin film.

*Example II*

A piece of lime-soda plate glass 6 inches by 6 inches by 3/16 inch containing a transparent electroconductive tin oxide film is coated with a zinc coating as in Example I with the exception that only 1/3 pound of zinc is mixed with the methanol solution.

The zinc coated base is treated as in Example I with the solution made up of ferric chloride and hydrochloric acid and an adhering layer of bright tin metal is formed in the areas treated with the zinc and acid-salt solution. By turning the treated plate over, the presence of a tin oxide coating adjacent the glass and in between the glass and tin metal layer can be observed due to the difference in the color of the film as produced by reflected light.

Various other salts were used in conjunction with zinc and a dilute non-oxidizing acid to test their ability to reduce a tin oxide film to a tin film. The salts were tested in the same manner as shown in the example above. The concentration of the salt was about 2 grams per hundred grams of 1.5 normal aqueous solution of hydrochloric acid or saturated, whichever concentration was the lesser. These solutions contain metal salt and hydrochloric acid in the proportions of at least about 9 mol equivalents of hydrochloric acid to each mol of metal salt.

The following salts of iron, cobalt, and nickel, when employed in the above described test, produced a bright tin film:

Ferrous and ferric chloride, ferric ammonium oxalate, ferric citrate, cobalt chloride, cobalt sulfate, cobalt phosphate, cobalt acetate, cobalt ammonium sulfate, nickel chloride, nickel silicofluoride, nickel cyanide, nickel tartrate, nickel acetate, nickel formate, and nickel sulfate.

The following salts, when used in conjunction with zinc and a dilute non-oxidizing acid in the manner described above, did not produce a tin film: ferric chromate and nitrate; cobal nitrate; nickel nitrate; chromium chloride, fluoride, acetate, and chromium potassium sulfate; cadmium chloride, sulfate, bromide, carbonate, iodide, and formate; indium trichloride; thallium sulfate, nitrate, and formate; zinc chloride, sulfate, and nitrate; manganese acetate, lactate, and chloride; and the chlorides of copper, sodium, aluminum, and calcium.

Various acids may be used in lieu of dilute aqueous solutions of hydrochloric acid; for example, hydrobromic acid, sulfuric acid, phosphoric acid, phosphorous or sulphurous acid, or other mineral acid or equivalent acid which does not readily etch glass and in which the anion thereof is essentially non-oxidizing in character. The concentration of the acid used normally is within 0.5 to 10 percent by weight of the aqueous solution although other solutions could be used.

The amount of acid used in conjunction with the above described salts is capable of some variation. There should be sufficient to thoroughly wet the zinc coated surface.

Generally, it is desired in order to achieve reduction of the tin oxide film to a layer of tin in accordance with the invention that about one mole of a salt of iron, cobalt, or nickel as enumerated above be applied in combination with about up to 100 equivalents of one of the acids set forth above. If too small an amount of the salt with respect to the acid is used, the tin oxide will go into solution and no appreciable amount of tin will be formed.

As a further embodiment, it has been discovered that if ratios of 0.017 mole of iron, cobalt, or nickel salt per gram of zinc and above are employed, the presence of an acid as described above is not necessary to produce a metal film. The following example is illustrative:

*Example III*

A piece of lime-soda plate glass 6 inches by 6 inches by 3/16 inch containing a transparent electroconductive tin oxide film is coated with a zinc coating as in Example I.

The zinc coated base is treated as in Example I with 10 milliliters of an aqueous solution of nickel chloride containing about 45 percent by weight of nickel chloride. A shiny tin layer is formed.

The invention is particularly applicable for use in connection with the reduction of a transparent electroconductive tin oxide film to an adherent tin film. However, the invention is also applicable in connection with the reduction of tin oxide and other metal oxides in combination in the same film such as films containing a major amount, at least 70 to 80 percent by weight of tin oxide with minor amounts of the oxides of antimony, copper, zinc, thallium, vanadium, chromium, manganese, cobalt, cadmium, indium and/or titanium.

Furthermore, the invention may be practiced with regard to the reduction of other metal oxide films to produce metal films on a refractory base such as cadmium oxide, zinc oxide, indium oxide, etc. and various combinations thereof as described above with respect to tin which may be prepared by contacting a heated refractory base with the bromide, chloride or acetate of the corresponding metal or mixture thereof.

Where viewing closures for vehicles are to be provided, the base for the film normally is ordinary or soda lime glass. Other refractory materials including borosilicate glass, china, mica, phosphate glass, silicon carbide, tungsten carbide, porcelain, stone or other refractory composition which melts at temperatures above 1150 to 1350° F. may be provided with metal films in accordance with this invention.

Although the present invention has been described with reference to the specific details of certain embodiments thereof, it is not intended that such details shall be regarded as limitations upon the scope of the invention except insofar as included in the accompanying claim.

What is claimed:

1. A method of producing a metal film on a refractory base having a metal oxide film thereon from the class consisting of tin, cadmium, indium and zinc oxides, combinations thereof and films containing at least 70 to 80% by weight of tin oxide with minor proportions of at least one oxide from the class consisting of oxides of antimony, copper, thallium, vanadium, chromium, manganese, cobalt and titanium, which method comprises subjecting the metal oxide film to a metal, an acid and an aqueous solution of a metallic salt, said metal taken from the class of metals more electropositive than the metal of the metal oxide film consisting of zinc, cadmium, iron and aluminum, said acid taken from the class consisting of hydrochloric, hydrobromic, sulfuric, phosphoric, phosphorus and sulfurous acids, and said salt taken from the class consisting of ferrous chloride, ferric chloride, ferric ammonium oxalate, ferric citrate, cobalt chloride, cobalt sulfate, cobalt phosphate, cobalt acetate, cobalt ammonium sulfate, nickel chloride, nickel silicofluoride, nickel cyanide, nickel tartrate, nickel acetate, nickel formate and nickel sulfate, the proportions of said acid and metal salt being from about 9 to 100 mol equivalents of acid per mol of metal salt.

2. The method according to claim 1 wherein the acid is applied as an aqueous solution having an acid concentration of between 0.5 and 10% by weight.

3. A method of producing a tin film on a refractory base having a tin oxide film thereon, which method comprises subjecting the tin oxide film to a metal, an acid and an aqueous solution of a metallic salt, said metal taken from the class of metals more electropositive than tin consisting of zinc, cadmium, iron, and aluminum, said acid taken from the class consisting of hydrochloric, hydrobromic, sulfuric, phosphoric, phosphorus and sulfurous acids, and said salt taken from the class consisting of ferrous chloride, ferric chloride, ferric ammonium oxalate, ferric citrate, cobalt chloride, cobalt sulfate, cobalt phosphate, cobalt acetate, cobalt ammonium sulfate, nickel chloride, nickel silicofluoride, nickel cyanide, nickel tartrate, nickel acetate, nickel formate and nickel sulfate, the proportions of said acid and metal salt being from about 9 to 100 mol equivalents of acid per mol of metal salt.

4. The method according to claim 3 wherein the acid is applied as an aqueous solution having an acid concentration of between 0.5 and 10% by weight.

5. A method of producing a tin film on a refractory base having a tin oxide film thereon, which method comprises subjecting the tin oxide film to simultaneous treatment of zinc, an acid, and an aqueous solution of a metal salt, said acid taken from the class consisting of hydrochloric, hydrobromic, sulfuric, phosphoric, phosphorus and sulfurous acids, and said salt taken from the class consisting of ferrous chloride, ferric chloride, ferric ammonium oxalate, ferric citrate, cobalt chloride, cobalt sulfate, cobalt phosphate, cobalt acetate, cobalt ammonium sulfate, nickel chloride, nickel silicofluoride, nickel cyanide, nickel tartrate, nickel acetate, nickel formate and nickel sulfate, the proportions of said acid and metal salt being from about 9 to 100 mole equivalents of acid per mol of metal salt.

6. A method of producing a tin film on a refractory base having a tin oxide film thereon, which method comprises applying zinc in the form of a pulverulent dispersion in a binder, and subsequently applying an aqueous solution of an acid and a metallic salt, said acid taken from the class consisting of hydrochloric, hydrobromic, sulfuric, phosphoric, phosphorus and sulfurous acids, and said salt taken from the class consisting of ferrous chloride, ferric chloride, ferric ammonium oxalate, ferric citrate, cobalt chloride, cobalt sulfate, cobalt phosphate, cobalt acetate, cobalt ammonium sulfate, nickel chloride, nickel silicofluoride, nickel cyanide, nickel tartrate, nickel acetate, nickel formate and nickel sulfate, the proportions of said acid and metal salt being from about 9 to 100 mol equivalents of acid per mol of metal salt.

7. A method of producing a tin film on a refractory base having a tin oxide film thereon, which method comprises coating the tin oxide film with an aqueous solution of an acid and a metallic salt, said acid taken from the class consisting of hydrochloric, hydrobromic, sulfuric, phosphoric, phosphorus and sulfurous acids, and said salt taken from the class consisting of ferrous chloride, ferric chloride, ferric ammonium oxalate, ferric citrate, cobalt chloride, cobalt sulfate, cobalt phosphate, cobalt acetate, cobalt ammonium sulfate, nickel chloride, nickel silicofluoride, nickel cyanide, nickel tartrate, nickel acetate, nickel formate and nickel sulfate, and subsequently contacting the coated film with a block of zinc, the proportions of said acid and metal salt being from about 9 to 100 mol equivalents of acid per mol of metal salt.

8. A method of producing a metal film on a refractory base having a metal oxide film thereon from the class consisting of tin, cadmium, indium and zinc oxides, combinations thereof and films containing at least 70 to 80% by weight of tin oxide with minor proportions of at least one oxide from the class consisting of oxides of antimony, copper, thallium, vanadium, chromium, manganese, cobalt and titanium, which method comprises subjecting the metal oxide film to zinc, an acid and an aqueous solution of a metallic salt, said acid taken from the class consisting of hydrochloric, hydrobromic, sulfuric, phosphoric, phosphorus and sulfurous acids, and said salt taken from the class consisting of ferrous chloride, ferric chloride, ferric ammonium oxalate, ferric citrate, cobalt chloride, cobalt sulfate, cobalt phosphate, cobalt acetate, cobalt ammonium sulfate, nickel chloride, nickel silicofluoride, nickel cyanide, nickel tartrate, nickel acetate, nickel formate and nickel sulfate, the proportions of metallic salt to acid being one mol of said salt to from 0 to 100 mol equivalents of said acid, and the minimum ratio of metallic salt to zinc applied being stoichiometrically equivalent to 0.017 mol of said salt to one gram of zinc.

9. A method of producing a metal film on a refractory base having a metal oxide film thereon from the class consisting of tin, cadmium, indium and zinc oxides, combinations thereof, and films containing at least 70 to 80% by weight of tin oxide with minor proportions of at least one oxide from the class consisting of oxides of antimony, copper, thallium, vanadium, chromium, manganese, cobalt and titanium, which method comprises subjecting the metal oxide film to zinc and an aqueous solution of a metallic salt taken from the class consisting of ferrous chloride, ferric chloride, ferric ammonium oxalate, ferric citrate, cobalt chloride, cobalt sulfate, cobalt phosphate, cobalt acetate, cobalt ammonium sulfate, nickel chloride, nickel silicofluoride, nickel cyanide, nickel tartrate, nickel acetate, nickel formate and nickel sulfate, wherein the minimum ratio of metallic salt to metal applied is stoichiometrically equivalent to 0.017 mol of metallic salt to 1 gram of zinc.

10. A method of producing a tin film on a refractory base having a tin oxide film thereon, which method comprises subjecting the tin oxide film to zinc, an acid and an aqueous solution of a metallic salt, said acid taken from the class consisting of hydrochloric, hydrobromic, sulfuric, phosphoric, phosphorus and sulfurous acids, and said salt taken from the class consisting of ferrous chloride, ferric chloride, ferric ammonium oxalate, ferric citrate, cobalt chloride, cobalt sulfate, cobalt phosphate, cobalt acetate, cobalt ammonium sulfate, nickel chloride, nickel silicofluoride, nickel cyanide, nickel tartrate, nickel acetate, nickel formate and nickel sulfate, the proportions of metallic salt to acid being one mol of said salt to from 0 to 100 mol equivalents of said acid, and the minimum ratio of metallic salt to metal applied being stoichiometrically equivalent to 0.017 mol of said salt to one gram of zinc.

11. A method of producing a tin film on a refractory base having a tin oxide film thereon, which method comprises subjecting the tin oxide film to zinc and an aqueous solution of a metallic salt taken from the class consisting of ferrous chloride, ferric chloride, ferric ammonium oxalate, ferric citrate, cobalt chloride, cobalt sulfate, cobalt phosphate, cobalt acetate, cobalt ammonium sulfate, nickel chloride, nickel silicofluoride, nickel cyanide, nickel tartrate, nickel acetate, nickel formate and nickel sulfate, wherein the minimum ratio of metallic salt to metal applied is stoichiometrically equivalent to 0.017 mol of metallic salt to 1 gram of zinc.

No references cited